United States Patent [19]

Lorteije

[11] Patent Number: 4,860,132
[45] Date of Patent: Aug. 22, 1989

[54] ROTATABLE HEAD ASSEMBLY WITH OFFSET SUB-HEAD GAPS

[75] Inventor: Jean H. J. Lorteije, Eindhoven, Netherlands

[73] Assignee: U.S. Philips Corporation, New York, N.Y.

[21] Appl. No.: 450,315

[22] Filed: Dec. 16, 1982

[30] Foreign Application Priority Data

Dec. 24, 1981 [NL] Netherlands .................. 8105831
May 4, 1982 [TW] Taiwan ..................... 71-11487

[51] Int. Cl.$^4$ .................................................. G11B 5/027
[52] U.S. Cl. .................................... 360/84; 360/107; 360/104; 360/121; 360/124; 360/21
[58] Field of Search ............ 360/84, 85, 83, 81, 360/106, 107, 104, 21, 121, 124

[56] References Cited

U.S. PATENT DOCUMENTS

| | | | |
|---|---|---|---|
| 2,969,529 | 1/1961 | Gilson | 360/124 |
| 3,549,822 | 12/1970 | Chupity | 360/121 |
| 3,604,847 | 9/1971 | Ganske | 360/84 |
| 4,296,430 | 10/1981 | Warren | 360/104 |
| 4,318,146 | 3/1982 | Ike et al. | 360/84 |
| 4,482,928 | 11/1984 | Moriya et al. | 360/84 |

FOREIGN PATENT DOCUMENTS

| | | | |
|---|---|---|---|
| 54-153613 | 12/1979 | Japan | 360/84 |
| 57-135421 | 8/1982 | Japan | 360/121 |

OTHER PUBLICATIONS

Albrecht et al., IBM Technical Disclosure Bulletin, "Dual-Gap Ferrite Head," vol. 20, No. 1, Jun. 1977, pp. 14–15.

Primary Examiner—John H. Wolff
Assistant Examiner—Matthew J. Bussan

[57] ABSTRACT

A rotatable magnetic head assembly for use in a magnetic tape recording/play-back device of the helical scanning type, the assembly comprising two diametrically oppositely located magnetic transducing heads (12, 12'). In order to enable recording of a number of tracks simultaneously without the use of a protective band, the heads (12, 12') are constructed and aligned relative to each other so that they form two oblique tracks (38A, 38B) on a magnetic tape (6) and a given intermediate space. At least one track (39A) is formed in the intermediate space by the other head.

8 Claims, 2 Drawing Sheets

ROTATABLE HEAD ASSEMBLY WITH OFFSET SUB-HEAD GAPS

BACKGROUND OF THE INVENTION

The invention relates to a rotatable magnetic head assembly for use in a magnetic tape recording/playback apparatus of a type in which the magnetic tape is wound around the assembly over such an angle as to enable the apparatus to operate in a helical scanning recording/playback mode. Such an assembly includes a rotatable supporting member which supports two diametrically oppositely located magnetic heads each of which has two subheads having mutually parallel transducing gaps which are positioned so as to form on the magnetic tape simultaneously two oblique tracks having a certain intermediate space. Between two tracks which are formed simultaneously by one of the two magnetic heads, at least one track is formed by the other magnetic head.

The present tendency is that a high-density recording technique is required, in particular, for recording analogue signals by digitization or for the manufacture of magnetic tape apparatus of smaller dimensions.

One of the methods of achieving such a high-density recording is carried out by using a rotatable head system which is currently used for video tape apparatus. Such apparatus may generally be described as types having one head, types having two heads and a 180° winding, and types having four heads. Another technique, which relates to this method, is multi-track recording in which an input signal is divided into a number of channels and these channels are recorded simultaneously in a number of recording tracks. This method is used in PCM audio type apparatus with fixed heads. Moreover, the above-mentioned two techniques can be combined to obtain recording and display devices of the rotatable scanning type as suggested in U.S. Pat. No. 3,604,847.

One of the magnetic recording systems described therein, involves the use of two diametrically oppositely located magnetic heads each in the form of a stack of two single sub-heads. The sub-heads of each magnetic head are stacked so that they are at a certain distance from each other and that their transducing gaps are situated on one line. Each magnetic head forms two oblique tracks on a magnetic tape with a protective band on either side of each track, the tracks having a pitch of a track width +3 protective band widths.

As used hereinafter in the specification and claims, the word pitch will be understood to mean the distance, measured in a direction perpendicular to the oblique tracks, from the leading edge of one track to the leading edge of the other track simultaneously recorded by that head.

In case a higher density should be desired in recording, the sub-heads could be positioned so close together that no protective band is formed in between the tracks. The construction of the heads then must become different. In order to prevent cross-talk during the playback, it is necessary, in the case in which the recording has taken place without a protection band, that heads which form adjacent tracks should have different gap angles with respect to the plane of the rotatable supporting member (a plane perpendicular to the axis of rotation). This method is termed "azimuth recording". The cross-talk between adjacent tracks is prevented by the principle of azimuth loss of the recording.

SUMMARY OF THE INVENTION

The primary object of the present invention is to provide a new magnetic head assembly for use in a multi-channel magnetic tape device of the rotatable scanning type which enables a method of recording without the use of a protective band.

According to the invention, a magnetic head assembly of the kind described in the opening paragraph is characterized in that the transducing gaps of the sub-heads of one head enclose angles with respect to the plane of the rotatable supporting member which are different from the angles of the gaps of the other head; and in that the sub-heads of each magnetic head form tracks having a track width W and a pitch of 2NW (where N=1, 3, 5 etc.)

As a result of the special construction of the rotatable magnetic head assembly according to the invention, it is achieved that first (during half a revolution of the supporting member) one multi-track head forms two parallel tracks on the magnetic tape with a given pitch (of, for example, two track widths). The first tracks are formed with the same first azimuth angle of the transducing gaps (of, for example, +15°). During the next half revolution of the supporting member the other multi-track head forms two parallel tracks on the magnetic tape with the same pitch as the first head. These next two tracks are formed with the same second azimuth angle of the transducing gaps (in this case, for example, −15°). The tracks are interleaved, so that one track of the second set is formed in the intermediate space between the first set. In this manner, it is ensured that adjacent tracks on the magnetic tape are formed with different azimuth angles so that disturbing cross-talk is avoided. This manner of recording makes it possible to use very simple multi-track heads which are suitable for mass production and which have only two transducing gaps parallel to each other.

In order to realize a homogeneous covering of the magnetic tape with tracks, it is essential for the tracks to be formed on the magnetic tape by a given head with a pitch which is equal to an odd number of times double the track width. As will be explained hereinafter, a pitch which is equal to three times the double track width proves to be a very suitable choice in practical recording/display systems.

In one embodiment, the supporting member is assembled on a rotatable upper drum which is mounted coaxially with a fixed lower drum. Two head windows, through which the heads can contact and scan the magnetic tape when it is wound around the drums, are formed on the circumference of the rotatable upper drum.

BRIEF DESCRIPTION OF THE DRAWING

An embodiment of the invention will now be described in greater detail, by way of example, with reference to the accompanying drawings. In the drawings.

DESCRIPTION OF THE PREFERRED EMBODIMENTS

Figure 1:
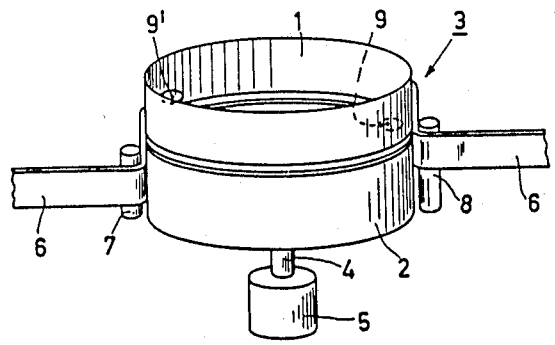
FIG. 1 is a diagrammatic perspective view of a rotatable drum device in which a magnetic head assembly is incorporated.
Figure 2:
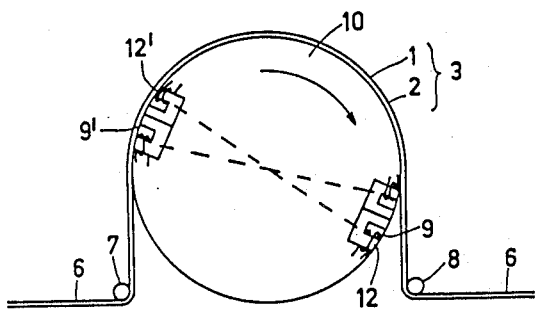
FIG. 2 is a diagrammatic plan view which shows the situation in which a magnetic tape is wound around the rotatable drum device of FIG. 1.

A recording and/or playback device equipped with a rotatable head assembly according to the invention has the construction as is shown in FIGS. 1 and 2, in which a rotatable upper drum 1 and a fixed lower drum 2 form a tape guide system 3. The rotatable upper drum 1 is mounted on a shaft 4 rotated by a motor 5. During the recording and/or the reproducing of (e.g. television) signals, the upper drum 1 is driven while a magnetic tape 6 is guided by a pair of guide pins 7 and 8 as shown in FIG. 1. The tape 6 is wound on the circumference of the tape guide system 3 over such an angle as to enable a helical scanning recording and/or playback mode.

Figure 3:
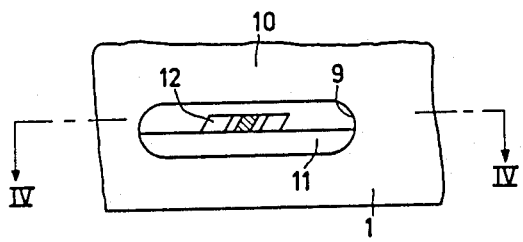
FIG. 3 is a front view, on an enlarged scale, of an important part of the rotatable drum device in which a magnetic head assembly having two multi-track heads according to the invention is used.

The rotatable upper drum 1 has a head window 9 from which a multi-track magnetic head 12 of a head assembly 10 projects to scan the magnetic tape 6, and a head window 9' from which the other multi-track magnetic head 12' of the head assembly 10 projects. All this can better be seen from FIG. 2 which is a plan view of the drum device 3 of FIG. 1. FIG. 3 shows that the head assembly 10 within the upper drum 1 comprises a head support 11 and a multi-track magnetic head 12 of the type as shown in FIG. 4.

Figure 4:
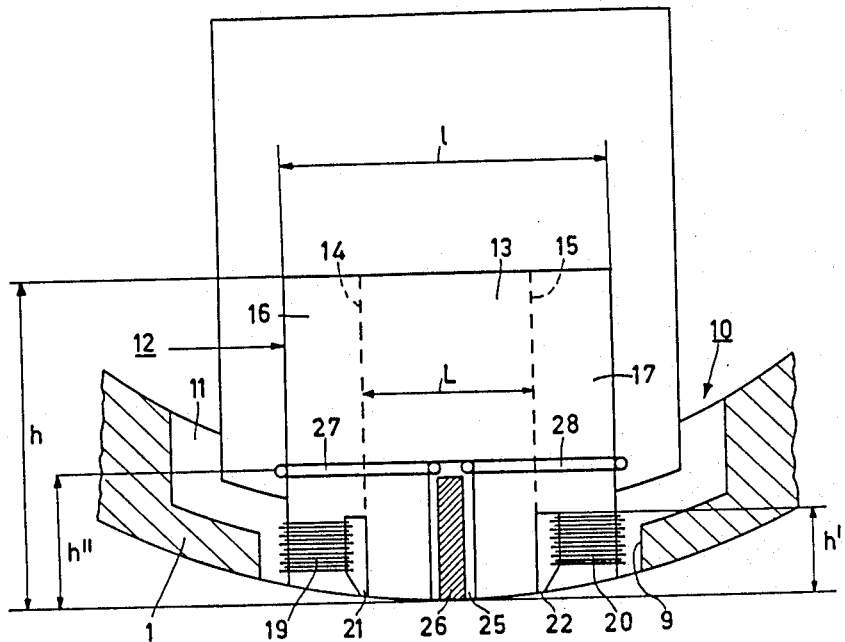
FIG. 4 is a sectional view taken on the line IV—IV of FIG. 3.

As shown in FIG. 4, the multi-track head 12, which in this case is a two-track head, consists of a block-shaped central part 13 of a magnetizable material, for example, ferrite. Part 13 has two sides 14, 15 which are accurately parallel. The width L of the central part 13 is brought to a desired value with great accuracy. A C-shaped core part 16 is provided against the side 14 and a C-shaped core part 17 is provided against the side 15, both parts being of the same magnetizable material as the central part 13. In one embodiment, the parts 16, 17 are adhered to the central part 13 by means of glass. On the front or tape contact side, transducing gaps 21, 22 are formed between the parts 13, 16 and 13, 17, respectively. These gaps 21, 22 are accurately parallel because the sides 14 and 15 are accurately parallel. The assembly is completed by write/read/windings 19, 20.

In order to make cross-talk as small as possible, in one embodiment, the central part 13 has a slot 25. A magnetic screen 26 may be provided in the slot 25. Cross-talk can further be reduced by providing a short-circuit turn 27 around the magnetic circuit which is formed by core part 16 and a part of the central part 13, and another short-circuit turn 28 around the magnetic circuit which is formed by core part 17 and a portion of the central part 13.

The head 12' shown in FIG. 2 is of the same type as head 12.

Figures 5A, 5B:
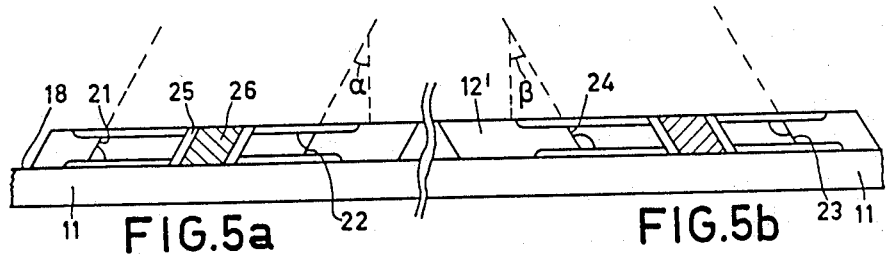
FIG. 5a is a front view, on an enlarged scale, of one of the two multi-track heads in one embodiment of the magnetic head assembly according to the invention.
FIG. 5b is a front view, on an enlarged scale, of the other of the two multi-track heads in one embodiment of the magnetic head assembly according to the invention.

The transducing gaps 21, 22 of head 12 and the transducing gaps 23, 24 of head 12' are in particular relationship to each other and to that of the other head, as is shown in FIGS. 5a and 5b which are front views on an enlarged scale of the two magnetic heads.

FIGS. 5a and 5b show the surface of the head support 11 with the position and the angle of the transducing gaps in each multi-track head 12, 12'.

FIGS. 5a and 5b also show an upper surface 18 of the head support 11. As shown in FIG. 5a, the transducing gaps 21, 22 are located at mutually different heights with respect to the upper surface 18. In the example of FIG. 5a, the width and the height of each transducing gap 21, 22 have been so chosen that a given space (i.e. intermediate space) is formed between recording tracks formed by means of the head 12. In itself, this space also depends on the angle the head 12 makes with the upper surface 18. In the present case, this angle is 0°. The same applies to the tracks formed by the head 12' of FIG. 5b provided with transducing gaps 23, 24. Head 12' is arranged relative to head 12 in such manner that the track formed by means of the transducing gap 23 just falls in the space between tracks formed by means of the transducing heads 21, 22 of head 12.

The embodiment shown permits of high-density magnetic recording, for example, digital recording of video signals, in which the recording is carried out without protective bands. For that purpose, the transducing gaps 21, 22 and 23, 24 have mutually different angles ($\alpha$ and $\beta$, respectively) with respect to the normal to the upper surface 18 of the head support 11, as is shown in broken lines; that is, they gave mutually different azimuth angles. In this construction, the occurrence of cross-talk between adjacent tracks is avoided by the azimuth loss. The tracks may have a width, for example, of 11 $\mu$m, i.e. half the track width used in the known Philips V2000 recording system.

Figure 6:
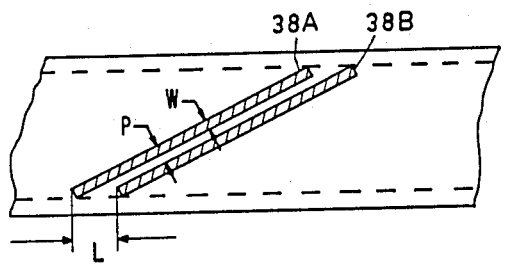
FIG. 6 is a plan view, partly broken away, of a magnetic tape in which an example of a track pattern is shown which is formed after half a revolution by the head assembly according to the invention.
Figure 7:
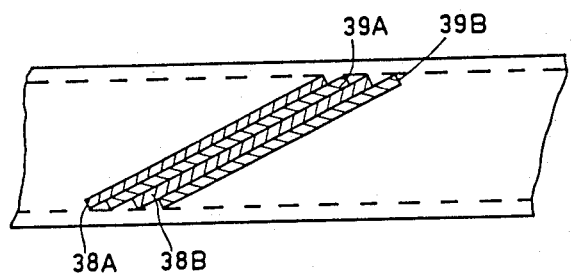
FIG. 7 is a plan view, partly broken away, of a magnetic tape which shows a track pattern after one full revolution by the head assembly according to the invention.

FIGS. 6 and 7 show track patterns which are formed by using the rotatable head assembly according to the invention.

In the FIGS. 6 and 7 embodiment, a recording which is entirely free from protection bands is carried out. The tracks 38A, 38B are formed in one half rotation of the upper drum 1 and the subsequent half rotation thereof forms two subsequent tracks 39A, 39B. In this case, the pitch P between two successive tracks having a width W is equal to 2W.

In the above-described embodiments, the explanation has been given only with reference to a two-channel system. The present invention can equally be used in a three-channel system or a four-channel system. In the latter system, for example, multi-track heads having four transducing gaps are used.

It will be obvious that a variety of modifications may be carried out in this invention without departing from the spirit and the scope of this invention.

The above-suggested recording system has been tested in a V2000 recording system in which the two conventional video heads were replaced by two track heads of the type indicated by reference numerals 12 and 12'. In a V2000 system, the tape speed is 24.4 mm per second. At a "frame rate" of 50 frames/sec, the distance L on the magnetic tape between the beginning points of the "twin" tracks is approximately 488×N μm.

To ensure minimum cross-talk between the two magnetic circuits of a two-track head, the distance L between the two transducing gaps should be as large as possible. On the other hand, a good mechanical contact between the head the tape and a simple manufacture of the head require a small value for L. A suitable choice has proven to be that which corresponds to N=3, so in the present case L=3×488 μm=1.464 mm. Other relevant dimensions of the "twin track" head are:

l=3 mm; h=3 mm; h'=0.6 mm; h"=1.25 mm.

What is claimed is:

1. A rotatable magnetic head assembly for a helical scan recording/playback apparatus, said assembly comprising a rotatable supporting member defining an axis of rotation, two diametrically oppositely located magnetic heads mounted on said member, each head comprising two sub-heads having mutually parallel transducing gaps positioned for simultaneously forming two oblique tracks on a magnetic tape wound helically around the assembly, said tracks being spaced by a given space defining track pitch, said heads being arranged such that one sub-head of one head forms a track between the two tracks formed simultaneously by the two sub-heads of the other head, the respective transducing gaps of each sub-head of each head being separated in both axial and circumferential directions with respect to said axis of rotation, said axial and circumferential separations of the gaps of the sub-heads of one head being respectively equal to the axial and circumferential separations of the gaps of the sub-heads of the other head, said gaps of the sub-heads of one magnetic head being inclined at a first angle relative to the plane of rotation of the supporting member, and the transducing gaps of the sub-heads of the other magnetic head being inclined at a second angle relative to the plane of rotation of the supporting member, said second angle being opposite in direction to said first angle, said gaps having respective heights and axial and circumferential separations such that the gaps of the sub-heads of one head form tracks of a track width W having a pitch of 2NW where N is an odd number, such that all tracks are formed substantially without protective bands between them.

2. An assembly as claimed in claim 1, characterized in that each magnetic head comprises a central block having two opposite sides; two C-shaped magnetic cores, one said core disposed on each respective side and arranged such that between each core and the central block a transducing gap is formed; and an electric winding arranged on each core.

3. A rotatable magnetic head assembly as claimed in claim 1, characterized in that N=3.

4. A rotatable magnetic head assembly as claimed in claim 1, characterized in that the supporting member is assembled on a rotatable upper drum which is mounted coaxially with a fixed lower drum and that a head window through which the heads can contact the magnetic tape and scan same when it is wound around the drums is formed on the circumference of the rotatable upper drum.

5. A rotatable magnetic head assembly as claimed in claim 2, characterized in that a slot is formed in the central block between the transducing gaps.

6. A rotatable magnetic head assembly as claimed in claim 5, characterized in that a short-circuit turn is wound around each C-core and also extends through the slot.

7. A rotatable magnetic head assembly as claimed in claim 6, charcterized in that a magnetic screen is provided in the slot.

8. A transducing head adapted for use in a rotatable magnetic head assembly as claimed in any of claim 1.

* * * * *